Figure 3:
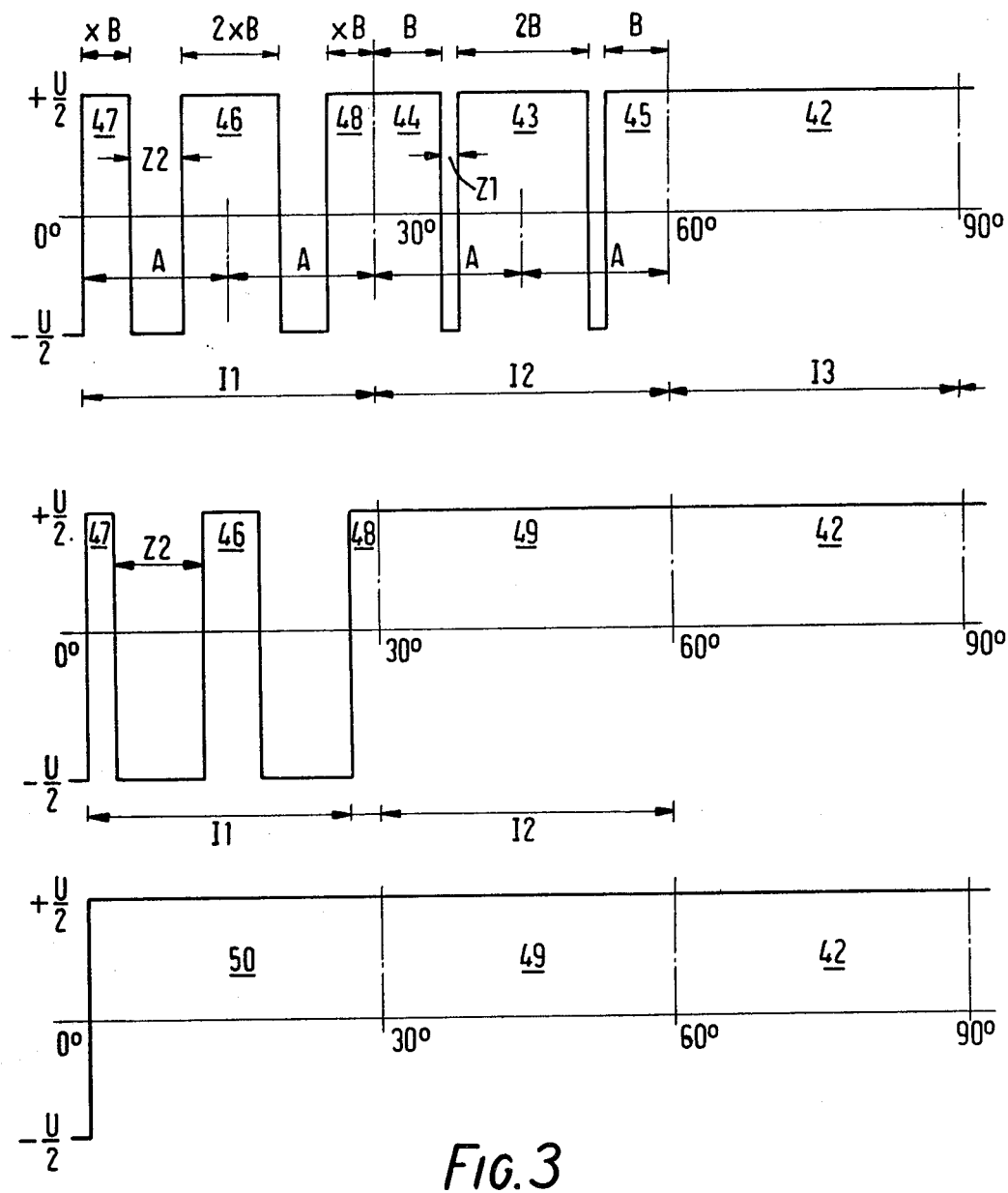

United States Patent [19]

Jensen

[11] 4,086,623
[45] Apr. 25, 1978

[54] METHOD AND APPARATUS FOR CONTROLLING AN INVERTED RECTIFIER

[75] Inventor: Arne Jensen, Sonderborg, Denmark
[73] Assignee: Danfoss A/S, Nordborg, Denmark
[21] Appl. No.: 746,491
[22] Filed: Dec. 1, 1976
[30] Foreign Application Priority Data
  Dec. 3, 1975  Germany ............................. 2554259
[51] Int. Cl.² ........................................... H02M 7/515
[52] U.S. Cl. ...................................... 363/41; 318/227
[58] Field of Search ..................... 318/227; 363/39–42
[56] References Cited
U.S. PATENT DOCUMENTS

| 3,585,488 | 6/1971 | Gutt et al. ............................. 318/227 |
| 3,624,486 | 11/1971 | Oates .................................. 363/41 X |
| 3,710,229 | 1/1973 | Jessee .................................... 363/41 |
| 3,820,003 | 6/1974 | Tappeiner et al. ..................... 363/41 |
| 3,958,171 | 5/1976 | Sekino .................................. 363/41 |
| 4,002,958 | 1/1977 | Akamatsu ............................ 318/227 |

*Primary Examiner*—William M. Shoop

[57] ABSTRACT

The invention relates to a method and apparatus for controlling an inverted rectifier having a constant DC supply voltage and adjustable frequency and amplitude of the fundamental oscillation of the output voltage. The rectifier is for an AC motor and the phase voltage is at least partly formed by width-modulated pulses and the voltage-time area of the pulse series is increased to eliminate an inadequate pulse spacing. Switching elements in the rectifier require a certain switching time and care must thus be taken to ensure that certain minimum pulse widths or pulse spacings must be observed to avoid short circuiting in the rectifier. Also to be avoided is pulse bridging which leads to a sudden increase in the voltage-time area and thus to a leap in the amplitude of the fundamental oscillation of the output voltage. The effects of this, e.g. in the magnetization of a connected motor, are undesirable. In accordance with the invention the increase in the voltage-time area is partially compensated by a reduction in the widths of at least some of the remaining pulses. Every time the voltage-time area is suddenly increased, the width of other impulses is reduced by way of compensation. The entire voltage-time area is therefore not suddenly increased, so that a substantially continuous voltage control can be achieved. If the remaining pulses have a smaller width after the compensation, the spacing therebetween is increased and the following switching-over becomes delayed. In a preferred embodiment each phase voltage consists of six sections of which the third and fourth are unmodulated, the second and fifth are occupied by wider impulses, and the first and sixth are occupied by narrower impulses, and switching-over to unmodulated operation takes place in the second and fifth or first and sixth sections and the reduction in impulse widths takes place in the respective remaining sections. This form of phase voltage gives a linked voltage that has extremely few higher harmonics. This switching-over produces between the normal operation and the maximum voltage, at which the entire half-wave consists of a through-going voltage block, at least one intermediate stage in which regulation is possible without the impulse spacings becoming too small.

15 Claims, 5 Drawing Figures

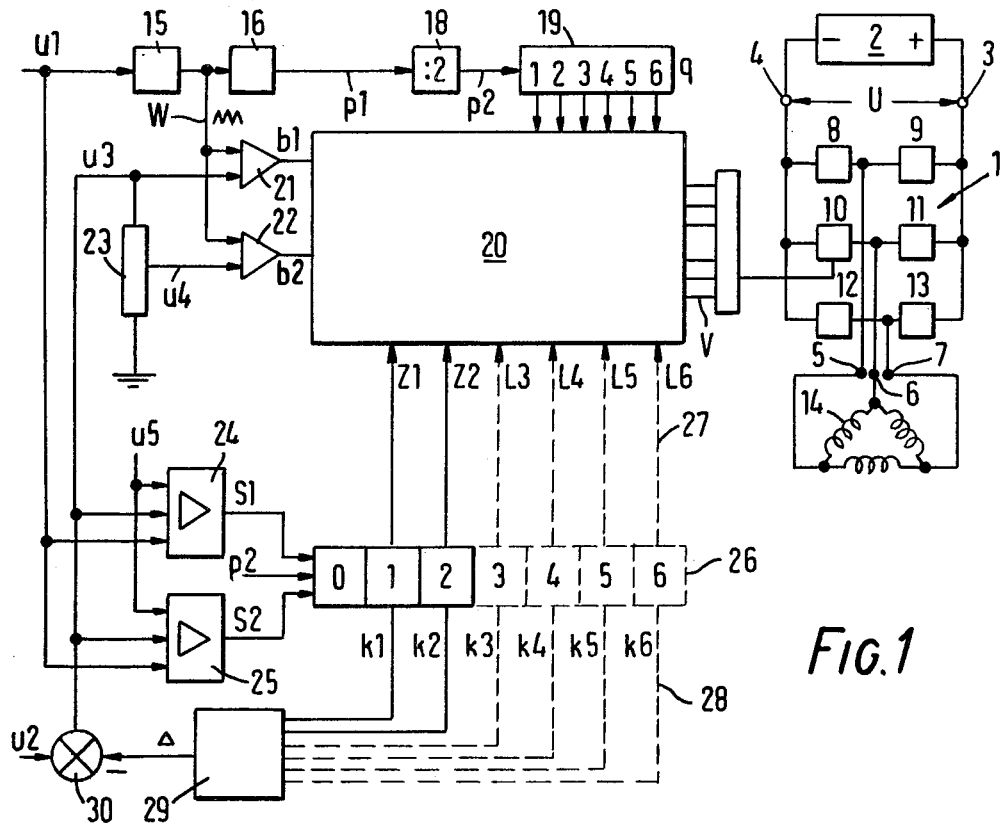
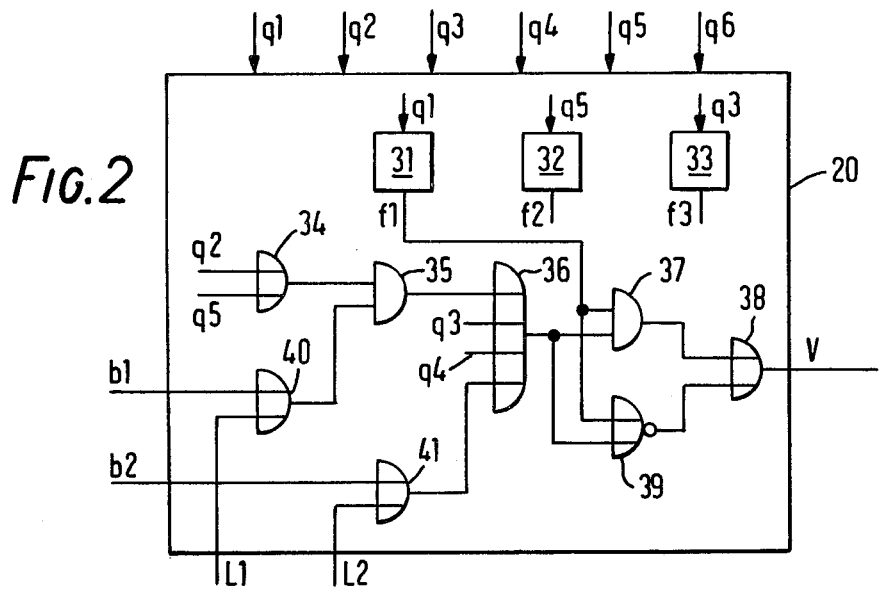
Fig.1
Fig.2

METHOD AND APPARATUS FOR CONTROLLING AN INVERTED RECTIFIER

It is known to feed an inverted rectifier with a constant DC voltage and to vary the frequency as well as the amplitude of the fundamental oscillation of the output voltage in that, during each half-wave, each terminal is on several occasions alternately connected to the positive and the negative pole of the DC voltage supply, so that a plurality of impulses of controllable width will result. Such inverted rectifiers comprise switching elements, e.g. thyristors and overrunning diodes which permit the rapid change in polarity. It is, however, to be noted that a series of switching elements, particularly thyristors, require a certain switching time and this leads to the fact that care must be taken to ensure that certain minimum impulse widths or impulse spacings must be observed because otherwise a short circuit could result in the inverted rectifier. In this connection it is immaterial in what manner the widths and spacings of the impulses have been set. For example, the so called under-oscillation method is known in which a curve with the frequency of the desired fundamental oscillation is intersected by a wave train of higher frequency. It is also known to form the first and third 60° sections of a half-wave by means of voltage blocks and to use a particular and possibly changeable number of impulses in the central 60° section.

A method of the aforementioned kind is known in which the impulses distributed over the entire half-wave have a different width and spacing but are symmetrically arranged with respect to the centre of the half-wave. When the impulses are widened and the spacing between the two central impulses therefore becomes too small, an extinction delay sets in at the end of the first of these two impulses, so that the spacing is bridged. Similarly, the other impulse spacings may also be gradually bridged. However, each bridge leads to a sudden increase in the voltage-time area and thus to a leap in the amplitude of the fundamental oscillation of the output voltage. The effects of this, e.g. in the magnetisation of a connected motor, are undesirable.

The invention is therefore based on the problem of providing a method of the aforementioned kind with which the sudden changes in the output voltage can be entirely or partially avoided.

This problem is solved according to the invention in that the increase in the voltage-time area is partially compensated by a reduction in the widths of at least some of the remaining impulses.

Every time the voltage-time area is suddenly increased, the width of other impulses is reduced by way of compensation. The entire voltage-time area is therefore not suddenly increased, so that a substantially continuous voltage control can be achieved. If the remaining impulses have a smaller width after the compensation, the spacing therebetween is increased and the following switching-over becomes delayed.

It is of particular advantage if it is ensured that the increase in the voltage-time area is effected in that at least one first predetermined section switching-over occurs from modulated to unmodulated operation and that the reduction in impulse width is carried out in at least one second predetermined section. In this case it is not the spaces between individual impulses that are bridged but the impulses and impulse sections of a particular zone are completely replaced by a voltage block.

This block replacement leads to particularly simple control circuits. However, since it gives rise to a comparatively large jump in the output voltage, it would be useless by itself. However, this application becomes possible in conjunction with the simultaneously conducted compensation by reducing other impulse widths.

It has proved desirable for each predetermined section to amount to 30°.

In a preferred embodiment, it is ensured that each phase voltage consists of six sections of which the third and fourth are unmodulated, the second and fifth are occupied by wider impulses, and the first and sixth are occupied by narrower impulses, and switching-over to unmodulated operation takes place in the second and fifth or first and sixth sections and the reduction in impulse widths takes place in the respective remaining sections. This form of phase voltage gives a linked voltage that has extremely few higher harmonics. This switching-over produces between the normal operation and the maximum voltage, at which the entire half-wave consists of a through-going voltage block, at least one intermediate stage in which regulation is possible without the impulse spacings becoming too small.

An even smoother transition with a plurality of stages can be achieved in that the increase in the voltage-time area takes place only in one part of the phases and the reduction in impulse widths takes place at least in the remaining phases. It is recommendable to provide at least four-stage switching-over to unmodulated operation, namely (1) in the second and fifth sections of one part of the phases, (2) in the second and fifth sections of the remaining phases, (3) in the first and sixth sections of one part of the phases and (4) in the first and sixth sections of the remaining phases, the impulse width being reduced in those sections that are still modulated.

It is very advantageous if the width of the impulses is determined by the intersection of a control voltage with a preferably triangular wave train and that, simultaneously with an increase in the voltage-time area, a compensating voltage is produced in opposition to the control voltage. This gives a very simple type of compensation because all impulses are reduced in their width but only the still modulated sections are affected. A triangular voltage can be used as the wave train of which the frequency has a fixed ratio to the fundamental wave of the desired output voltage.

The compensating voltage should be less than 70% of the first control voltage. If several switching-over stages are provided, it can increase with each stage. In this case, it should amount to less than 50% of the first control voltage.

An apparatus for carrying out the method is characterised according to the invention by a switching-over device which, depending on the impulse spacing or a corresponding quantity, delivers switching-over signals to eliminate an inadequate impulse spacing by increasing the voltage-time area and simultaneously initiates a compensating voltage to reduce the widths of at least some of the remaining impulses. The double function of the switching-over device simultaneously produces the desired compensation.

An advantageous apparatus comprises an impulse generator delivering width signals of a width depending on a control voltage, a zone signal generator delivering zone signals in predetermined increments, a logic portion which, depending on the switching-over signals, transmits predetermined combinations of the width signals, zone signals and switching-over signals to produce the phase voltages, and a switching device upstream of the impulse generator, in which the compensating voltage is subtracted from the second control voltage. The inverted rectifier is controlled in the desired manner by simply changing the combination in the logic portion.

In a preferred embodiment, this is achieved in that a wave train generator of which the frequency is determined by the first control signal controls the zone signal generator which governs predetermined sections of a half-wave, that two impulse generators deliver wider and narrower width signals depending on the wave train and a second control signal, and that the zone signals are combinable with the width signals and the switching-over signals in the logic portion.

A particularly simple circuit is obtained if the logic circuit comprises OR elements through which the width signals and switching-over signals can be passed. The permanently applied width signals are then overcontrolled on the occurrence of the switching-over signals.

Further means for achieving a simple circuit construction consist in that the switching-over device comprises a programme unit which can be switched up or down, switches one stage up on falling below a first predetermined impulse spacing, switches one stage down on exceeding a preferably larger second predetermined impulse spacing and the output signals of which serve as switching-over signals on the one hand and initiate a compensating voltage in a switching device on the other hand. The outputs of the programme unit in each case correspond to a fixed predetermined combination in the logic portion. The programme unit preferably has four to seven stages. If the programme unit is connected to the inputs of the logic circuit such that, on continued upward switching, the previously occupied outputs remain occupied, each output of the programme unit need not be associated with the entire combination but only the difference from the combination of the preceding outputs.

Serving as means for determining the critical impulse spacing there are preferably two analogue computers which are fed with a constant signal, the second control signal reduced by the compensating voltage, and a voltage proportional to the frequency of the wave train, one of the computers applying to the programme unit an upward signal and the other a downward signal on exceeding and respectively falling below an associated predetermined computed value. By computing the impulse spacing, one saves the otherwise necessary time elements.

Figure 4:
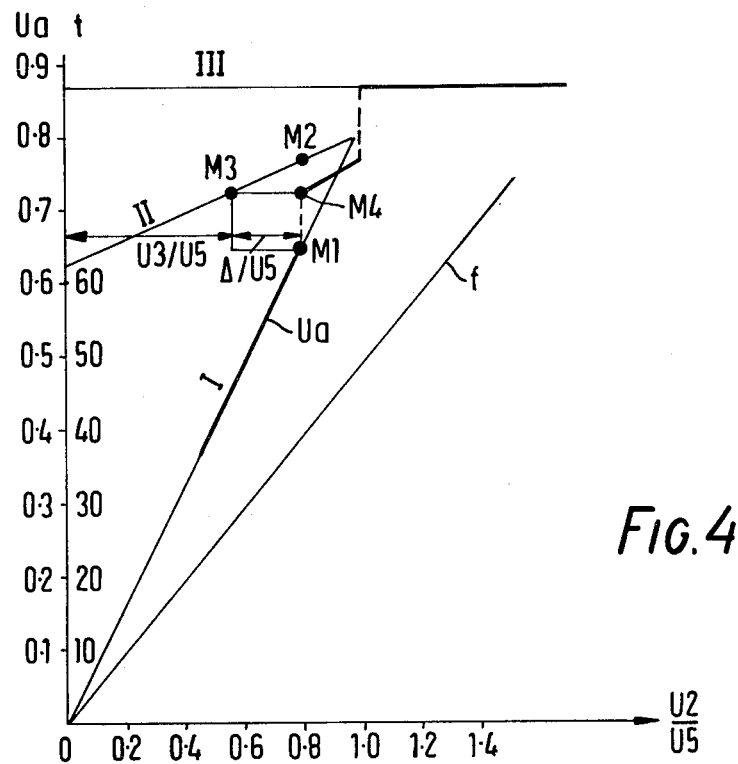
Figure 5:
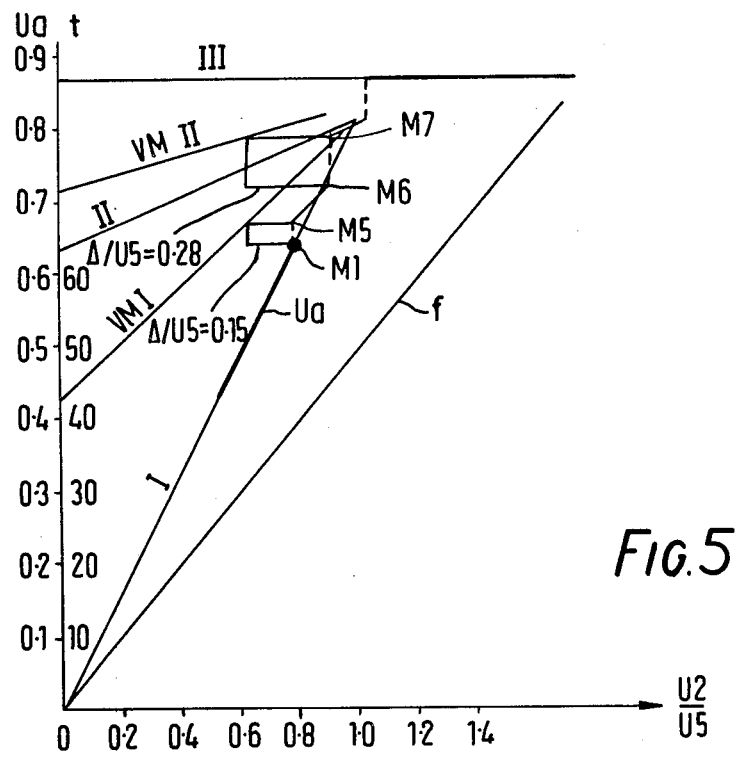

The invention will now be described in more detail with reference to the examples shown in the drawing, wherein:

FIG. 1 is a diagrammatic circuit of the invention;
FIG. 2 shows an embodiment of the logic portion;
FIG. 3 illustrates a half-wave of the phase voltage and three conditions that may occur when changing from modulated to unmodulated operation;
FIG. 4 illustrates the characteristic of the frequency and the output voltage of a motor in dependence on the control signals, with an intermediate stage when changing from modulated to unmodulated operation, and
FIG. 5 shows a similar characteristic as in FIG. 4 but with two intermediate stages.

FIG. 1 shows a conventional inverted rectifier 1 which is supplied with a voltage U from a constant DC voltage supply 2 so that a positive potential exists at the input terminals 3 and a negative potential exists at the input terminal 4, each amounting to U/2. The DC voltage supply 2 can for example consist of a battery or an AC-fed rectifier arrangement. The output terminals 5, 6 and 7 are each connected between two series-connected switcing elements 8 and 9, 10 and 11 and 12 and 13, respectively. One of the switching elements, which should particularly be thyristors, is conductive and the other is blocked. An AC load is connected to the output terminals, in this case a delta-connected minor 14. The frequency of the fundamental oscillation of the output voltage at the terminals 5 to 7 and thus the rotary speed of the motor 14 is variable with the aid of a first control signal $u1$ and the amplitude of the fundamental oscillation of the output voltage is variable with the aid of a second control signal $u2$. Both control signals may be fed in the same direction or even be formed by a common signal.

The first control signal $u1$ is a voltage which influences a voltage-controlled oscillator 15 which produces a triangular wave train $w$. The frequency of this wave train is proportional to the first control signal $u1$. A cycle generator 16 produces cycle impulses $p1$ on determining the lower peaks. These cycle impulses are divided by two in a divider 18. The resulting cycle impulses $p2$ are fed to a six-stage ring counter 19 which, at its outputs, successively produces every 30° interval signals $q1$ to $q6$ corresponding to the inverted rectifier frequency. These are fed to a logic portion 20.

In addition, the wave train $w$ is supplied to two comparators 21 and 22. The comparator 21 is fed with a control voltage U3. At the output there occurs a first width signal $b1$ for wider impulses when the control voltage $u3$ is larger than the voltage of the wave train $w$. The second comparator is fed with a control voltage $u4$ which is tapped from the tapping of a voltage divider 23 supplied with the first control voltage $u3$. Two width signals $b2$ occur at its output when the control voltage $u4$ is larger than the voltage of the wave train $w$. The width signals $b1$ and $b2$ are supplied to the logic portion 20.

The outputs of the logic portion feed switching control signals $v$ to a converter in which they are adapted to the control inputs of the switching elements 8 to 13.

There are also two analogue computers 24 and 25 to which there are fed the first control signal $u1$, the first control voltage $u3$ and a fixed voltage $u5$. Such an analogue computer is for example described in more detail in applicants' simultaneously filed application 'Means on an inverted rectifier'. The control voltage $u3$ is the second control signal $u2$ corrected by a compensating voltage Δ. The analogue computer 24 delivers a switching signal $s1$ which, after the occurrence of a switching impulse, e.g. an impulse $p2$, switches the programme unit 26 over. The switching signal $s1$ occurs at critically short impulse spacings. The analogue computer 25 delivers a switching signal $s2$ which, on the occurrence of a switching impulse $p2$, switches the programme unit 25 over in the opposite direction. The switching signal $s2$ indicates that the programme unit can be switched back for short impulse spacings without danger. A reversible counter can be used as the programme unit 25 which, with the aid of the analogue computers 24 and 25, is switched up or down on the occurrence of the switching impulse $p2$. Two outputs 27 and 28 are associated with each stage of the programme unit, one of the outputs delivering switching-over signals 11 – 16 to the logic portion 20 and the other delivering initiating signals $k1 - k6$ that are fed to a compensating voltage generator 29. The outputs 27 and 28 may be combined to form a common conduit so that the switching-over signals and the initiating signals are formed by the same voltage. In the compensating signal generator 29 there are produced, in dependence on the initiating signals $k1 - k6$, compensating voltages $\Delta$ which are subtracted in a switching device 30 from the second control signal $u2$ so that the first control voltage $u3$ is obtained.

In FIG. 2 there is shown a possible circuit for the logic portion 20. Three bistable multi-vibrators 31, 32 and 33 are provided which are controlled by the interval signals $q1$, $q5$ and $q3$ respectively. The bistable multi-vibrator 31 delivers a half-wave signal $f1$ on the occurrence of the interval signal $q1$ and this lasts until the next occurrence of the interval $q1$. Similarly, the half-wave signals $f2$ and $f3$ are produced in the bistable multi-vibrators 32 and 33.

The interval signals $q2$ and $q5$ are fed through an OR element 34 and linked to the width signal $b1$ in an AND element 35. The linked signal is fed to an OR element 36 which is also fed with the interval signals $q3$ and $q4$ as well as being permanently fed with the width signal $b2$. The output signal of the OR element 36 is linked to the half-wave signal $f1$ in an AND element 37 and transmitted through an OR element 38 as a switching control signal $v$. In order that the associated switching element will also receive the correct information during the next following half-wave, the output signal of the OR element 36 is linked to the half-wave signal $f1$ in a NOR element 39 and likewise transmitted through the OR element 38. The width signals $b1$ may be over-controlled by the switching-over signal $l1$ in an OR element 40 and the width signals $b2$ may be over-controlled by the switching-over signal $l2$ in an OR element 41. The circuit here described for a switching element of the inverted rectifier corresponds to the circuits for the other switching elements. Depending on the desired number of intermediate stages, the OR elements 40 and 41 may be the same for all phases or individual to each phase. In the former case, a three-stage programme unit 26 will suffice and in the latter case the programme unit must have correspondingly more stages, for example seven stages.

With such a circuit, operation can be as will now be described in conjunction with FIG. 3. FIGS. 3a, 3b and 3c each show the first half of a half-wave. This half-wave is symmetrical to the 90° plane. The following half-wave is symmetrical to the 180° point. The half-wave is sub-divided into six 30° intervals I1 - I6 of which only the intervals I1 - I3 are shown in FIG. 3. The intervals correspond to the period of each interval signal $q1$ to $q6$.

In FIG. 3a, the phase voltage in the intervals I3 and I4 is equal to the potential $+U/2$ throughout, i.e. unmodulated. One therefore obtains blocks 42 throughout. This is the influence of the interval signals $q3$ and $q4$ in the OR element 36. In the intervals I2 and I3 there occur a wider impulse 43 with a width 2B and two wider half impulses 44 and 45 between which there is a spacing Z1. This occurs by reason of the width signals $b1$ which are continuously supplied by way of the OR element 40 but are transmitted through the AND element 35 only in the presence of the interval signals $q2$ and $q5$. In the intervals I1 and I6 there occur a narrower impulse 46 having a width 2XB and two narrower half-impulses 47 and 48 between which there is a spacing Z2. These impulses result from the continuously fed width signals $b2$ which, however, are over-controlled in the other intervals in the OR element 36. The spacings between the centre lines A of the impulses are equal. In the intermediate spaces there is the negative potential $-U/2$. The value X lies between 0.5 and 1.0, preferably substantially between 0.73 and 0.78.

The width of the impulses is regulated in dependence on the desired amplitude of the output voltage of the inverted rectifier with the aid of the second control signal $u2$ and the control voltages $u3$ and $u4$ that are dependent thereon. If the spacing Z1 between the wider impulses 43, 44 and 45 thereby becomes too small, the analogue computer 24 delivers a switching signal S1 which, during the next occurrence of the impulse $p2$, leads to switching-over of the programme unit 26 from stage zero to stage 1. Accordingly, the output conduit 27 contains a switching-over signal l1 which can be represented as a logic signal '1'. This over-controls the width signals $b1$ in the OR element 40. On the occurrence of the interval signals $q2$ and $q5$ there therefore occurs a throughgoing voltage block 49. There has therefore been switching-over from modulated operation to unmodulated operation in the intervals I2 and I5. However, by means of the initiating signal $k1$, the compensating signal generator 29 has been energised in such a way that a predetermined compensating voltage $\Delta$ is delivered to the switching device 30. The result of this is that the first control voltage $u3$ becomes smaller; the period of the width signals $b1$ and $b2$ is reduced and the spacings z1 and z2 computed by the analogue computers 24 and 25 become larger. This does not occur in the intervals I2 and I3 but only in the intervals I1 and I6 where the narrower impulses 46, 47 and 48 receive a smaller width and a larger spacing.

If, now, the spacing Z1 computed by the analogue computer 24 again becomes too small, switching-over takes place to the stage two of the programme unit 26, so that the switching-over signal l2 over-controls the width signals $b2$ in the OR element 41. The switching-over signal l2 functions continuously so that throughgoing voltage blocks 50 are also present in the intervals I1 and I6, i.e. no modulation at all takes place any longer. Simultaneously, an initiating signal $k2$ is again fed to the compensating signal generator 29 which now delivers a larger compensating voltage $\Delta$ to the switching device 30. The first control voltage $u3$ is again reduced so that the width of the width signals $b1$ and $b2$ again become smaller. This, however, has no effect in the inverted rectifier.

It is only when the spacings Z1 computed by the analogue computer 25 become larger than a second limiting value which, in turn, is larger than the critical limit spacing calculated by the analogue computer 24, that a switching signal s2 is delivered which, on the occurrence of the next impulse $p2$, switches the programme unit 26 back to stage 1. Analogous considerations apply to switching back to the stage zero.

FIG. 3 describes the conditions with respect to the output voltage and the frequency of the inverted rectifier in dependence on the control signals $u1$ and $u2$. For reasons of simplicity, the following assumptions are made. $u5$ is equal to the peak voltage of the wave train $w$. Its minimum voltage is zero. When no compensating voltage exits, the first control voltage $u3$ is equal to the control signal $u2$ that is responsible for the amplitude of the output voltage. Since the wave train $w$ is intersected by the control voltage $u3$ in the width signal generator 21, one obtains full control when $u2 = u5$, the spacing $z1$ being zero. The control signals $u1$ and $u2$ have a linear functional relationship in the relevant zone because it is intended to keep the frequency and voltage substantially proportional to one another. Further, the setting is such that full control should be achieved at a frequency of 50 Hz. The minimum permissible impulse spacing $Z_{min}$ amounts to 0.2 msec. $X = 0.74$. The OR elements 40 and 41 are common to all phases.

FIG. 4 then shows $u2$ on the abscissa to a relative scale, i.e. referred to $u5$. The control voltage $u3$ and the compensating voltage $\Delta$ are shown to the time scale. The frequency $f$ and, to a haphazard scale, the output voltage $U_a$ of the inverted rectifier are shown along the ordinate. In this case the curves I, II and III correspond to the output voltages for the curve shapes of FIGS. 3a, 3b and 3c, respectively.

With increasing frequency and corresponding increasing output voltage the analogue computer 24, which is set to 0.2 msec, responds at $u2/u5 = 0.8$, i.e. at about 40 Hz, whereupon switching-over occurs from curve I to curve II in the logic portion 20. This would normally lead to a voltage jump from the point M1 to the point M2. However, since the control signal $u2$ is simultaneously reduced by the amount of the compensating voltage $\Delta$, one obtains a corespondingly smaller control voltage $u3$. If one enters this, in each case related to $u5$, one obtains a working point M3 on the curve II, which sets the switching-over point M4 in the diagram. Upon further increase of the control signal $u2$, the voltage rises parallel to the curve II, i.e. with less durchriff. At $u2/u5 = 1.01$, i.e. at a value of about 50 Hz the analogue computer 24 again responds and the voltage jumps from curve II to curve III. The durchriff is here zero. The compensating voltage can therefore be set to any desired value. However, care should be taken that the compensation is not so large that the impulses become criticaly narrow. For example, the compensating voltage may amount to 55% of the voltage $u5$ during the first switching-over and 57% of the voltage $u5$ during the second switching-over. In the latter case, the analogue computer 25 should respond at an impulse spacing of 0.47 msec.

FIG. 5 illustrates a diagram similar to FIG. 4. However, the difference is that there is a set of OR elements 40 $u$ –$v$ and 41 $u$–$v$ for the phases $u$ and $v$. Further, a set of OR elements 40w and 40w is provided for the phase $w$.

The first switching-over takes place at about 40 Hz, during which a switching-over signal is fed only to the OR element 40 $u$–$v$. Consequently a curve VMI is made effective which forms the balanced mean value of the curves I and II and sub-divides their spacing in the ratio 1:2. A compensating voltage of 15% of the voltage $u5$ was simultaneously initiated. Consequently the voltage moves from the point M1 to the point M5. During further increase in frequency, the voltage rises parallel to the curve VMI until the analogue computer 24 again responds at about 46.5 Hz. This controls the OR elements 40w and 41w, whereby the phase $w$ is completely changed from modulated to unmodulated operation. This results in a curve VMII which represents the balanced mean value of the curves II and III and sub-divides their spacing in the ratio 1:2. However, a compensating voltage of 28% of the voltage U5 is simultaneously introduced. Accordingly, there is a jump from the point M6 to the point M7. The frequency can now be increased further up to about 51.5 Hz, whereupon the analogue computer 24 again responds and the OR element 41 $u$–$v$ is also controlled. The voltage goes over to the curve III. Any desired compensating voltage of, for example, 0.47% can here be set. If one lets the analogue computer 25 respond at 0.385 msec, one achieves that, with a drop in frequency, switching back occurs at the values $u2/5 = 1.00$, 0.87 or 0.79, respectively.

It will be seen from FIGS. 4 and 5 that the voltage jump taking place during a particular interval during transition from modulated to unmodulated operation is reduced by the compensating voltage. Simultaneously, it is possible to extend the zone in which regulation can still take place up to the full control corresponding to the nominal frequency. The sections of the characteristic voltage curve that are active after switching-over are substantially adapted to the desired curve section I.

I claim:

1. A method of controlling an inverted rectifier with constant DC supply voltage and adjustable frequency and amplitude of the fundamental oscillation of the output voltage, comprising the steps of forming at least part of the phase voltage by width-modulated impulses, increasing the voltage-time area of the impulse series to eliminate an inadequate impulse spacing, and partially compensating the increase in the voltage-time area by reducing the widths of at least some of the remaining impulses, said increase in voltage-time area being characterized by a switching-over from modulated to unmodulated operation in at least one first predetermined section and the reduction in impulse widths is carried out in at least one second predetermined section.

2. A method according to claim 1, characterized in that each predetermined section is 30°.

3. A method according to claim 2, characterized in that each phase voltage consists of six sections of which the third and fourth are unmodulated, the second and fifth are occupied by wider impulses, and the first and sixth are occupied by narrower impulses, and switching-over to unmodulated operation takes place in the second and fifth or first and sixth sections and the reduction in impulse widths takes place in the respective remaining sections.

4. A method according to claim 1, characterized in that the increase in the voltage-time area takes place only in one part of the phases and the reduction in impulse widths takes place at least in the remaining phases.

5. A method according to claim 3, characterized by at least four-stage switching-over to unmodulated operation, namely (1) in the second and fifth sections of the one part of the phases, (2) in the second and fifth sections of the remaining phases, (3) in the first and sixth sections of one part of the phases and (4) in the first and sixth sections of the remaining phases the impulse width being reduced in those sections that are still modulated.

6. A method according to claim 1, characterized in that the width of the impulses is determined by the intersection of a control voltage with a preferably triangular wave train and that, simultaneously with an increase in the voltage-time area, a compensating voltage is produced in opposition to the control voltage.

7. A method according to claim 3, characterized in that the wider impulses are determined by means of a compensatable first control voltage and the narrower impulses by means of a second control voltage having a fixed ratio to the first control voltage.

8. A method according to claim 6, characterized in that the compensating voltage is less than 70% of the first control voltage.

9. A method according to claim 6, characterized in that in the case of several switching-over stages, the compensating voltage increases with each stage.

10. A method according to claim 9, characterized in that the compensating voltage is less than 50% of the first control voltage.

11. A control system for an inverted rectifier of the type having a constant DC supply voltage, comprising, a voltage controlled oscillator forming a triangular wave form, an oscillator voltage source for said oscillator, pulse generator means for forming first and second sets of width modulated pulses, voltage compensated control means for generating a control voltage for controlling said pulse generator means to modulate said first and second sets of pulses, a zone signal generator having the input thereof connected to said oscillator for generating zone signals in predetermined increments, first and second analog computers having their inputs connected to said voltage control means and to said oscillator voltage source for respectively indicating critically short pulse spacings and adequate pulse spacings, a program unit having inputs connected to said analog computers for increasing the voltage-time areas of said wave train to eliminate inadequate pulse spacing and simultaneously reducing the widths of at least some of the remaining pulses, and a logic section having inputs connected to said pulse generator means and said zone signal generator and said switching device for transmitting predetermined combinations of the signals at its inputs to produce the phase voltages for said rectifier.

12. A control system according to claim 11 wherein said voltage control means includes a switching device upstream from said pulse generator having an input for an input control voltage, said voltage control means also including a compensating voltage generator having an input connected to said program unit and an output connected to another input of said switching device, and said switching device operating to subtract a compensating voltage increment generated by said compensating voltage generator from said input control voltage to produce said compensated control voltage.

13. A control system according to claim 12 wherein said pulse generator means includes two pulse generators which generate means wider and narrower width signals depending on said triangular wave form and on said compensated control voltage.

14. A control system according to claim 12 wherein said program unit which includes a register having bit stages which switches up on said pulse sets falling below a first predetermined impulse spacing and switches down on set pulse sets exceeding a preferably larger second predetermined impulse spacing, said program unit having output signals to said logic section which serve as switching-over signals and output signals to said compensating voltage generator to initiate a compensating voltage increment in said switching device.

15. A control system according to claim 14 wherein said program unit has four to seven bit stages.

* * * * *